US008888586B2

(12) United States Patent
Hsu

(10) Patent No.: US 8,888,586 B2
(45) Date of Patent: Nov. 18, 2014

(54) GAMING MACHINE PLAYER ACCOUNT IDENTIFICATION SYSTEM

(76) Inventor: Tien-Shu Hsu, Taichung (TW)

( * ) Notice: Subject to any disclaimer, the term of this patent is extended or adjusted under 35 U.S.C. 154(b) by 22 days.

(21) Appl. No.: 13/611,270

(22) Filed: Sep. 12, 2012

(65) Prior Publication Data

US 2014/0073419 A1 Mar. 13, 2014

(51) Int. Cl.
*G06F 17/00* (2006.01)

(52) U.S. Cl.
USPC .................................................... 463/29

(58) Field of Classification Search
USPC .................... 463/1, 25, 29–33, 36, 37, 39–43
See application file for complete search history.

(56) References Cited

U.S. PATENT DOCUMENTS 8,079,904 B2 * 12/2011 Griswold et al. ............... 463/25
8,240,558 B2 * 8/2012 O'Donnell .................... 235/380
2005/0181870 A1 * 8/2005 Nguyen et al. .................. 463/29
2006/0040741 A1 * 2/2006 Griswold et al. ............... 463/40
2008/0176645 A1 * 7/2008 Griswold et al. ............... 463/25
2009/0011821 A1 * 1/2009 Griswold et al. ............... 463/25

* cited by examiner

*Primary Examiner* — Ronald Laneau
(74) *Attorney, Agent, or Firm* — Muncy, Geissler, Olds & Lowe, P.C.

(57) ABSTRACT

A gaming machine player account identification system includes a non-contact account carrier and a gaming machine. The gaming machine includes a register processing unit, a display interface, and an account accessing element corresponding to the non-contact account carrier. The non-contact account carrier can be a radio frequency (RF) chip or a bar code unit. The account accessing element is a RF accessing element or an image capturing element and a bar code identification unit. Through the account accessing element, the player account data can be obtained in a non-contact fashion; then the bar code identification unit interprets the account QR code to get the player account data. Thus players can register simply by themselves and quickly verify the player account data to save account registration time and manpower to meet use requirements.

8 Claims, 6 Drawing Sheets

GAMING MACHINE PLAYER ACCOUNT IDENTIFICATION SYSTEM

FIELD OF THE INVENTION

The present invention relates to a gaming machine player account identification system and particularly to a non-contact account identification system.

BACKGROUND OF THE INVENTION

Gaming machines are relatively inexpensive, compact in size, operable by players individually anytime to enjoy a wide variety of games without the need of much labor or participation of other people, hence are very popular nowadays.

When a player wants to play games on a gaming machine, the player has to perform first account verification. The conventional account verification process is done by dedicated people manually. Once accepted, the player can open the account and play games on the gaming machine. While such an approach can get security desired, it consumes a lot of manpower in management. In the event that many players want to play the games at the same time, they have to wait for a long time in queue. This would reduce machine utilization. Some players also have privacy concern and do not like to ask operation staffs to start the machines each time they play, this also can lower their motivation of playing on the gaming machines.

In short, the registration approach of the conventional gaming machines creates a lot of concerns, such as longer waiting time that could turn off player's playing desire, player's privacy concern caused by manual registration and verification of account and result in lower motivation of playing the games. All this could reduce gaming machine utilization and business revenue.

SUMMARY OF THE INVENTION

Therefore the primary object of the present invention is to provide a gaming machine player account identification system to allow players to register and verify their accounts by themselves to save time and manpower, and also provide privacy for the players.

To achieve the foregoing object the gaming machine player account identification system according to the invention includes a non-contact account carrier and a gaming machine. The gaming machine includes a register processing unit, a display interface and an account accessing element corresponding to the non-contact account carrier. The non-contact account carrier can be a radio frequency (RF in short hereinafter) chip or a bar code unit. The account accessing element is a RF accessing element or image capturing element and a bar code identification unit.

In the event that the RF chip and RF accessing element are employed, the RF chip contains a player account data, and the RF accessing element has an induction zone to receive the RF chip so that the RF accessing element can get the player account data in a non-contact manner; and through the register processing unit the correctness of the player account data can be checked, and the display interface can display the player account data.

In the event that the bar code unit, image capturing element and bar code identification unit are employed, the bar code unit contains an account Quick Response (QR in short hereinafter) code. The account QR code is formed by encoding a player account data. The image capturing element has an image capturing zone to receive the bar code unit so that the image capturing element can get the account QR code in a non-contact manner. Moreover, the bar code identification unit can interpret the account QR code to get the player account data, and through the register processing unit the correctness of the player account data can be checked, and the display interface can display the player account data.

Thus, the invention allows the players to do account registration and verification, and greatly reduces the workload of operation people. In addition, the invention performs registration through a non-contact approach, operation is simpler and damage is less likely to happen, hence can meet use requirement of self-service by the players.

The foregoing, as well as additional objects, features and advantages of the invention will be more readily apparent from the following detailed description, which proceeds with reference to the embodiments and accompanying drawings. The embodiments serve merely for illustrative purpose and are not the limitations of the invention.

DETAILED DESCRIPTION OF THE PREFERRED EMBODIMENTS

Figure 1:
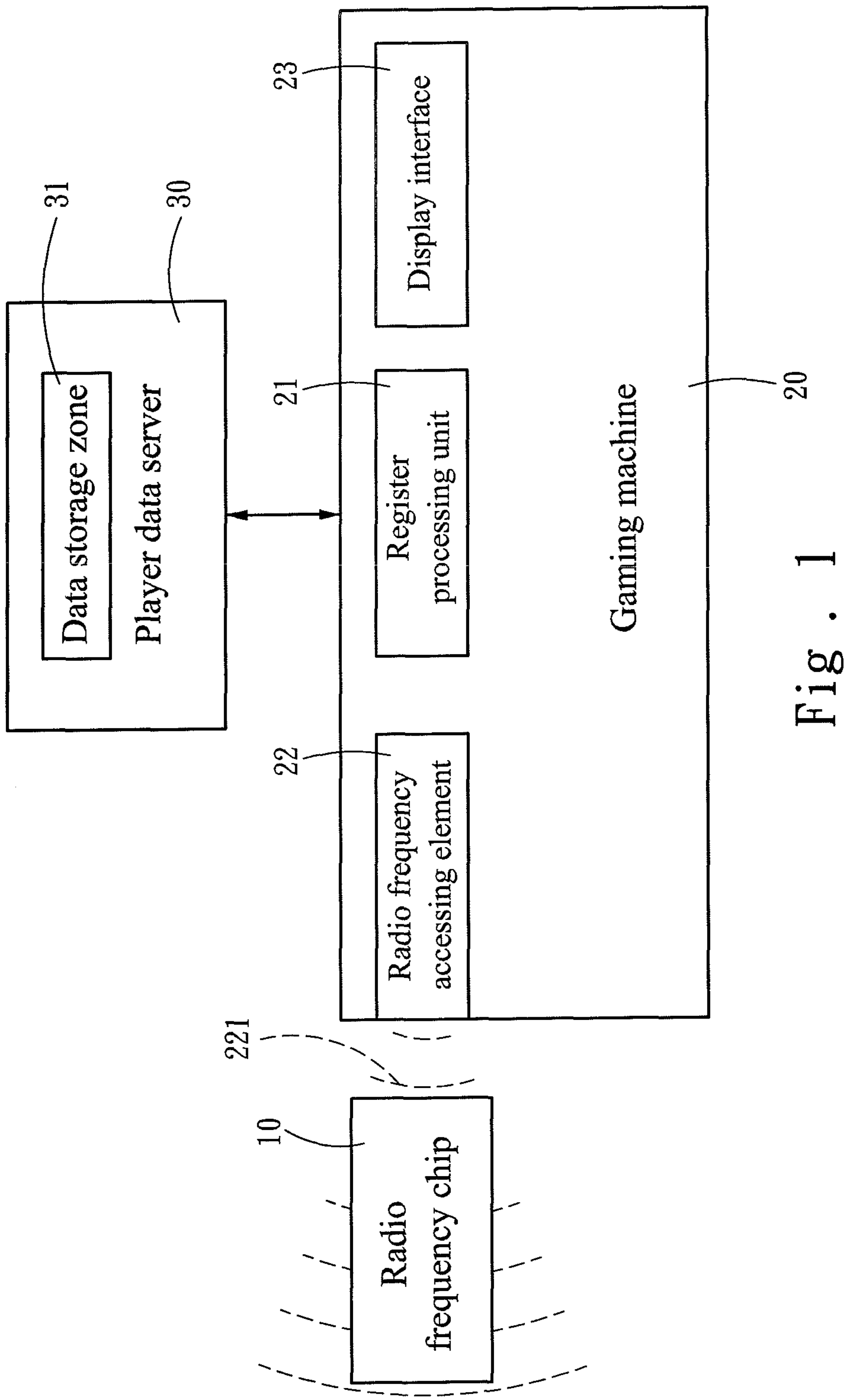
FIG. 1 is a schematic view of the system architecture of a first embodiment of the invention.
Figure 2:
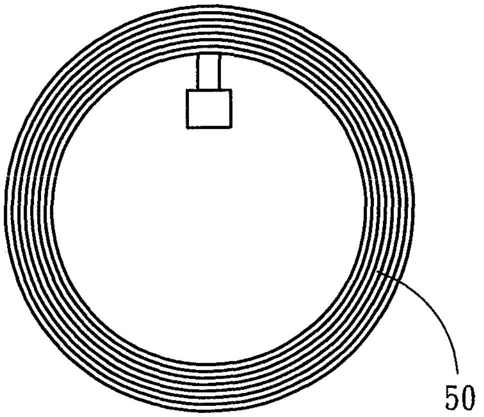
FIG. 2 is a schematic view of an induction coil in the first embodiment of the invention.

Please refer to FIGS. 1 and 2 for a first embodiment of the invention. The gaming machine player account identification system of the invention comprises a RF chip 10 and a gaming machine 20. The RF chip 10 can be an induction coil 50 and contains a player account data. The gaming machine 20 includes a register processing unit 21, a RF accessing element 22 and a display interface 23. The RF accessing element 22 has an induction zone 221 to receive the RF chip 10 so that the RF accessing element 22 can get the player account data in a non-contact manner, and the register processing unit 21 checks the correctness of the player account data, and the display interface 23 displays the player account data.

The gaming machine 20 can generate a game score, and save the game score in the RF chip 10 via the RF accessing element 22 so that the player can take the game sore away when leaving to accumulate the game score as desired.

In addition, the gaming machine 20 also can be connected to a player data server 30 which has a data storage zone 31 to save the player account data and game score generated by the gaming machine 20. The player account data saved in the data storage zone 31 can serve as a backup copy for verification. The game score in the data storage zone 31 can be updated into the player account data, and directly accumulated online to meet use requirement.

The RF chip 10 further can save a game credit which is purchased by the player and saved in the RF chip 10. When getting the player account data, the RF accessing element 22 also gets the game credit so that the player can play games on the gaming machine 20. In addition to saving the game score, the RF chip 10 also can save the remainder of the game credit to be used next time.

Figure 3:
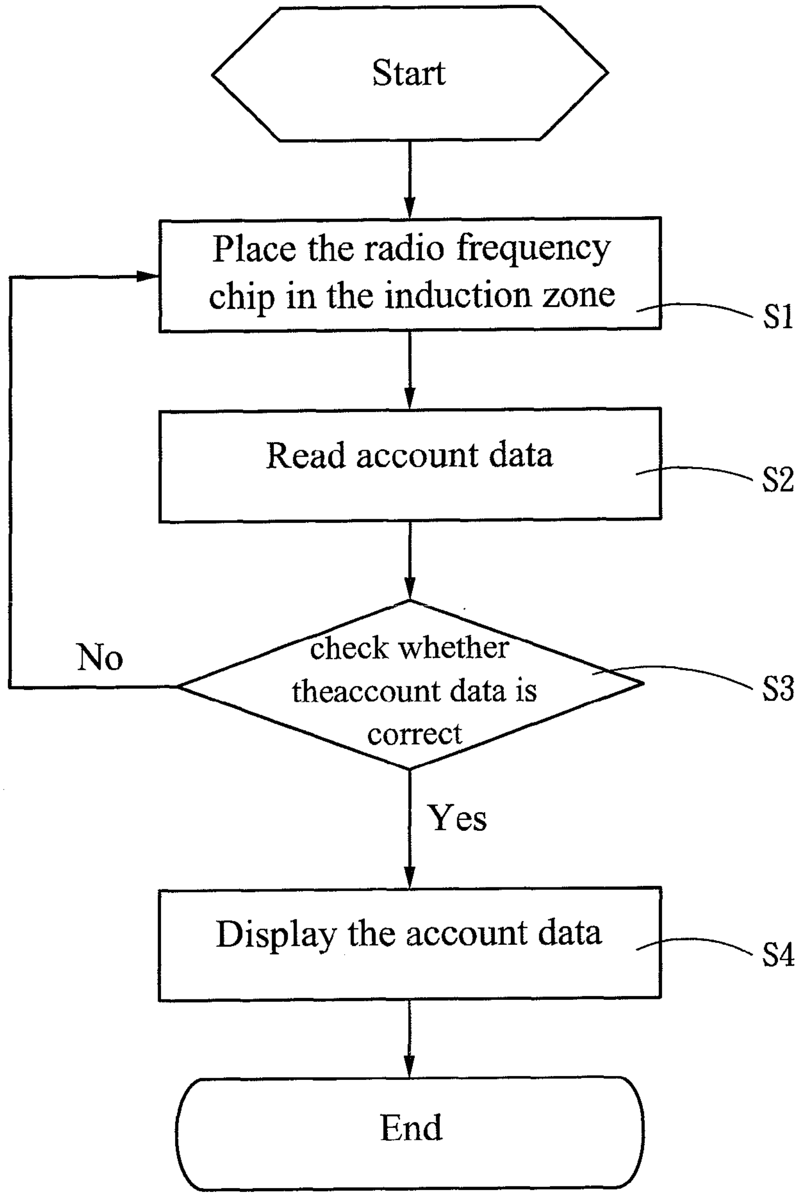
FIG. 3 is a process flowchart of the first embodiment of the invention.

Please refer to FIG. 3 for the process flow of the first embodiment. It includes steps S1 through S4. First, step S1: place the RF chip 10 in the induction zone 221. The induction zone 221 on the RF accessing element 22 covers a specific area, and the RF chip 10 must be moved manually to the induction zone 221 to trigger operation. Step S2: read account data, i.e. the RF accessing element 22 reads the player account data saved in the RF chip 10. Step S3: check correctness of the account data, which can be verifying a checking code or checking the player account data in the data storage zone 31 via the player data server 30 linked in an online condition. In the event that account checking error occurs, it could be reading error, then repeat step S2 to read the account data anew; if inspection correct, proceed step S4, and display the account data to be conformed by the player.

Figure 4:
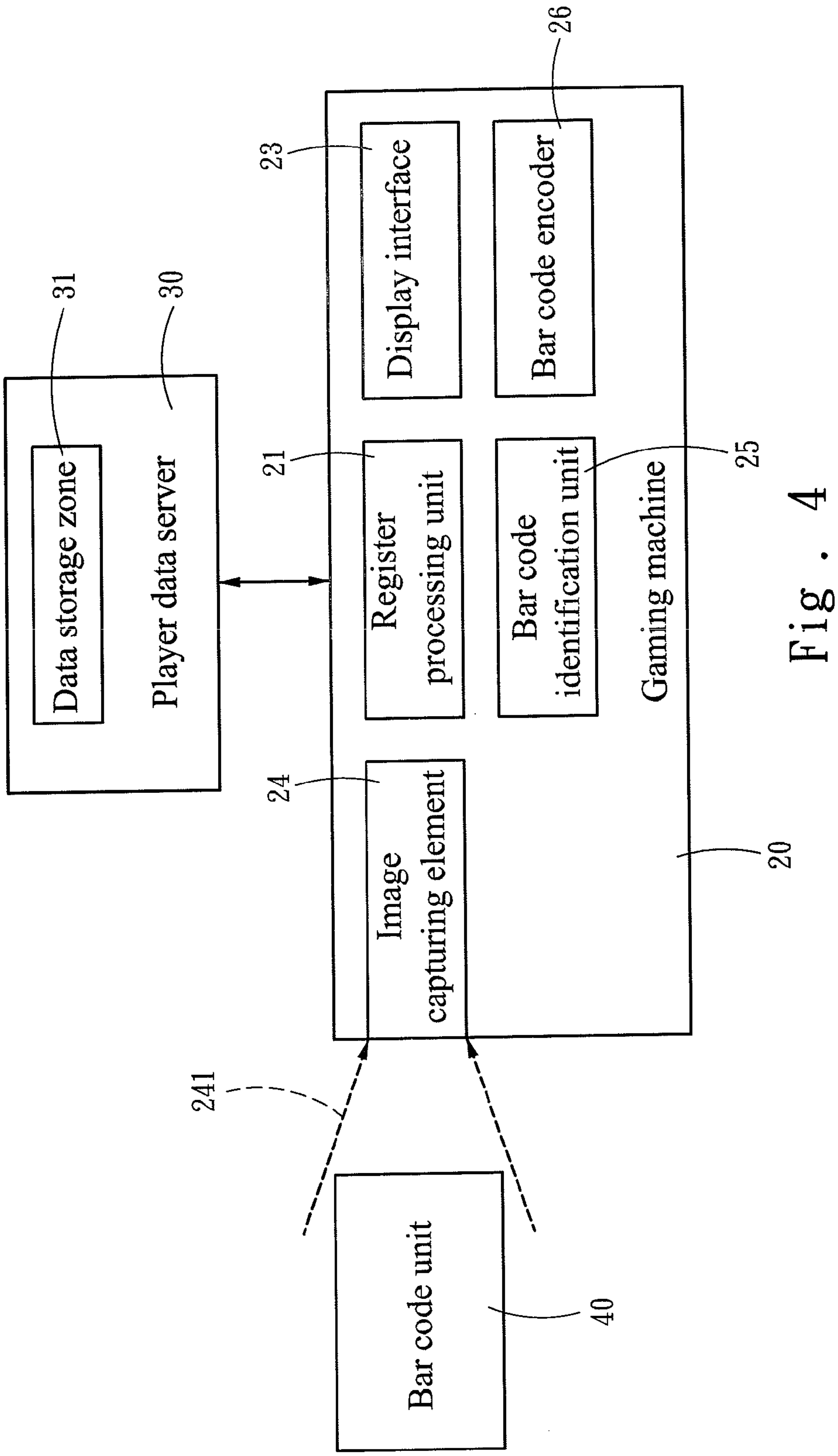
FIG. 4 is a schematic view of the system architecture of a second embodiment of the invention.
Figure 5:
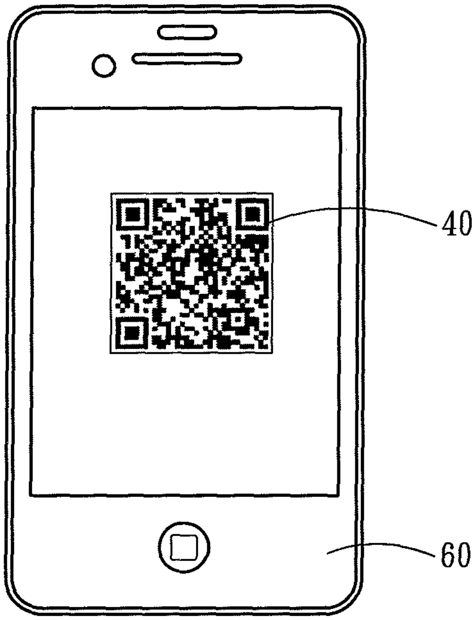
FIG. 5 is a schematic view of a handheld information product according to the second embodiment of the invention.
Figure 6:
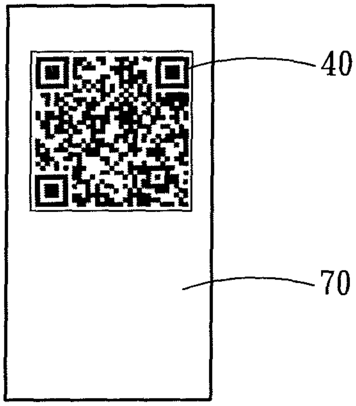
FIG. 6 is a schematic view of a physical card according to the second embodiment of the invention.

Please refer to FIGS. 4, 5 and 6 for a second embodiment of the invention. In this embodiment the gaming machine player account identification system comprises a bar code unit 40 and a gaming machine 20. The bar code unit 40 contains an account QR code formed by encoding a player account data. The bar code unit 40 can be digital data and carried in a handheld information product 60, such as a handset (as shown in the drawings), PDA, tablet computer or the like, or printed onto a physical card 70.

The gaming machine 20 includes a register processing unit 21, an image capturing element 23, a bar code identification unit 25 and a display interface 23. The image capturing element 24 has an image capturing zone 241 to receive the bar code unit 40 so that the image capturing element 24 can get the QR code in a non-contact manner. The bar code identification unit 25 can interpret the account QR code to get the player account data, and check the correctness of the player account data through the register processing unit 21, and display the player account data on the display interface 23.

In addition, the gaming machine 20 can generate a game score, and produce a score QR code through a bar code encoder 26. The score QR code can be carried by the player for accumulation as desired. Moreover, the game machine 20 also can be connected to a player data server 30 which has a data storage zone 31 to save the player account data and game score generated by the gaming machine 20. Hence a backup copy can be saved for verification against the player account data and accumulation of the game score online.

Figure 7:
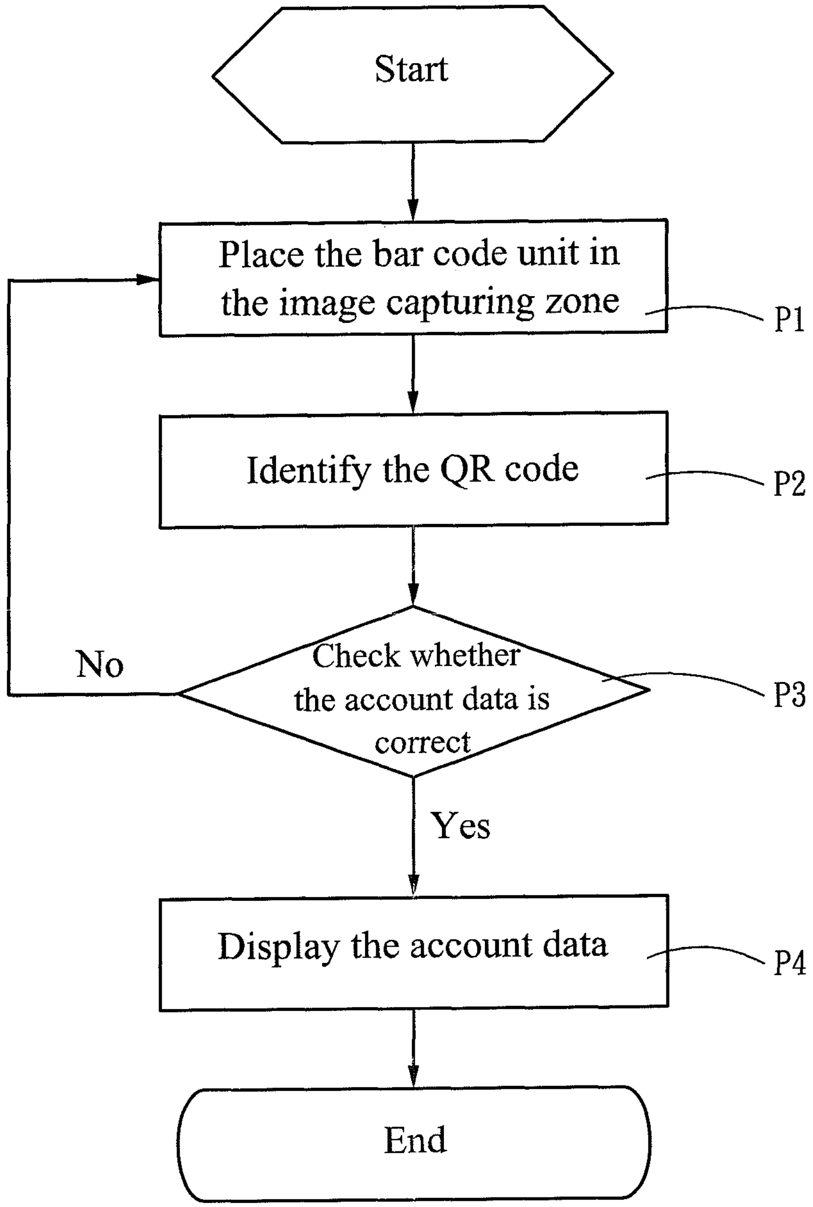
FIG. 7 is a process flowchart of the second embodiment of the invention.

Please refer to FIG. 7 for the process flow of the second embodiment. It includes steps P1 through P4. First, step P1: place the bar code unit 40 in the image capturing zone 241 to allow the image capturing element 24 to capture the account QR code of the bar code unit 40. Step P2: identify the account QR code of the bar code unit 40 to restore the player account data. Step P3: check the correctness of the account data, which can be verifying the checking code, or checking the player account data in the data storage zone 31 via the player data server 30 linked in an online condition. In the event that account checking error occurs, it could be reading error, then repeat step P1 anew by placing the bar code unit 40 in the image capturing zone 241; if checking correct, proceed step P4, and display the account data to be conformed by the player.

As a conclusion, the invention allows players to do account registration and verification by themselves, hence can greatly reduce the workload of operation people, and also can protect player's privacy. It employs registration in a non-contact fashion, operation is simpler and damage is less likely to happen, thus can meet players' self-service requirement.

What is claimed is:

1. A gaming machine player account identification system, comprising:

a radio frequency chip including a player account data and storing a game credit; and a gaming machine including a register processing unit and generating a game score, a radio frequency accessing element and a display interface; the radio frequency accessing element including an induction zone to receive the radio frequency chip so that the radio frequency accessing element is allowed to get the player account data and the game credit in a non-contact fashion at the same time and transmit the player account data to the register processing unit, and saving the game credit and a remainder of the game credit to the radio frequency chip, the register processing unit checking the correctness of the player account data, the display interface displaying the player account data.

2. The gaming machine player account identification system of claim 1, wherein the gaming machine generates a game score which is saved in the radio frequency chip via the radio frequency accessing element.

3. The gaming machine player account identification system of claim 1, wherein the gaming machine is connected to a player data server which includes a data storage zone to save the player account data and a game score generated by the gaming machine.

4. The gaming machine player account identification system of claim 1, wherein the radio frequency chip is an induction coil.

5. A gaming machine player account identification system, comprising:

a bar code unit which is digital data saved in a handheld electronic information product including an account QR code formed by encoding a player account data; and a gaming machine including a register processing unit, an image capturing element, a bar code identification unit, and a display interface; the image capturing element including an image capturing zone to receive the bar code unit so that the image capturing unit is allowed to get the account QR code in a non-contact fashion, the bar code identification unit interpreting the account QR code to get the player account data and transmitting the player account data to the register processing unit, the register processing unit checking the correctness of the player account data, the display interface displaying the player account data.

6. The gaming machine player account identification system of claim 5, wherein the bar code unit is printed on a physical card.

7. The gaming machine player account identification system of claim 5, wherein the gaming machine generates a game score and a score QR code, wherein the score QR code is generated through an encoding process of a bar code encoder.

8. The gaming machine player account identification system of claim 5, wherein the gaming machine is connected to a player data server which includes a data storage zone to save the player account data and a game score generated by the gaming machine.

* * * * *